US005854645A

United States Patent [19]

Witteveen et al.

[11] Patent Number: 5,854,645

[45] Date of Patent: Dec. 29, 1998

[54] INKJET ARRAY

[75] Inventors: Bontko Witteveen; Frederik Maria Van Beek, both of Venlo; Peter Wilhelmus Hubertus Engels, Beringe, all of Netherlands

[73] Assignee: Oce-Nederland B.V., Venlo, Netherlands

[21] Appl. No.: 584,360

[22] Filed: Jan. 11, 1996

Related U.S. Application Data

[63] Continuation-in-part of PCT/NL94/00147, Jun. 23, 1994.

[30] Foreign Application Priority Data

Jul. 19, 1993 [NL] Netherlands ............................ 9301259

[51] Int. Cl.[6] ...................................................... G01D 15/16

[52] U.S. Cl. ................................................ 347/68; 347/54

[58] Field of Search ......................................... 347/54, 68

[56] References Cited

U.S. PATENT DOCUMENTS

| | | | |
|---|---|---|---|
| 3,857,049 | 12/1974 | Zoltan . | |
| 4,367,478 | 1/1983 | Larsson . | |
| 4,546,361 | 10/1985 | Brescia . | |
| 4,689,641 | 8/1987 | Scardovi et al. | 346/140 R |
| 4,783,670 | 11/1988 | Conta et al. | 347/54 |
| 5,142,307 | 8/1992 | Elrod et al. | 346/140 R |
| 5,177,504 | 1/1993 | Ishii et al. | 346/140 R |
| 5,193,922 | 3/1993 | Hayashi . | |

FOREIGN PATENT DOCUMENTS

| | | |
|---|---|---|
| 0084458 | 7/1983 | European Pat. Off. . |
| 1238950 | 9/1989 | Japan . |

OTHER PUBLICATIONS

Jonathan J. Burnard, "Multiple Jet Body Driven Drop Generator" Dec. 1984 *Xerox Disclosure Journal* vol. 9 No. 6.

*Primary Examiner*—Daniel P. Malley
*Attorney, Agent, or Firm*—Birch, Stewart, Kolasch & Birch, LLP

[57] ABSTRACT

An inkjet array for a printer includes a number of elements. Each element has an ink chamber and an ink provider, and a piezo-actuator rigidly secured to one side of the ink chamber. The ink chamber is brought into motion in response to an image signal whereby an ink droplet is ejected from a nozzle of the ink chamber. Each of the ink chambers of the array can be brought into motion separately.

20 Claims, 4 Drawing Sheets

INKJET ARRAY

This application is a continuation-in-part of PCT international application No. PCT/NL94/00147 which has an international filing data of Jun. 23, 1994 which designated the United States, the entire contents of which are hereby incorporated by reference.

BACKGROUND OF THE INVENTION

1. Field of the Invention

The invention relates to an inkjet head array for a printer.

2. Description of the Background Art

An individual inkjet head of this kind is known from U.S. Pat. No. 3,857,049, which describes an inkjet head made up of a tubular ink chamber provided with a nozzle and a piezo-element disposed around the tube. The surface tension in the nozzle prevents the ink from escaping from the ink chamber if the element is not energized. An electrical pulse having a short rise time produces a sudden change of volume in the chamber. An acoustic pressure pulse of sufficient amplitude forms to overcome the surface tension. In this way an ink droplet is ejected.

If a receiving sheet is now moved past the nozzle and the piezo-element is energized image-wise, an image of ink droplets will be formed on the receiving sheet. This principle is known as "drop-on-demand".

U.S. Pat. No. 4,546,361 discloses another inkjet head in which a single capillary tube is connected to one end of a tubular piezo-element which is disposed concentrically around said tube and the other side of which is connected, for example, to a fixed part of a printer.

When the piezo-element is energized, the capillary tube moves axially so that an ink droplet is ejected via a nozzle provided in the capillary tube. A construction of this kind having a concentrically disposed piezo-element is not very suitable for integration in an inkjet array requiring a high nozzle density.

SUMMARY OF THE INVENTION

Therefore, it is an object of the invention to construct a "drop-on-demand" system in array form so that a smaller head can be formed which has greater reliability and improved energy efficiency. This head should eject droplets at a high frequency, so that it is possible to obtain a high-speed printer with high resolution. In such an inkjet array, the ink chambers lie in a first plane, separated from each other. Each chamber can be brought into motion separately.

With the inkjet array according to the invention, the formation of air or vapor bubbles in the ink chamber is reduced in comparison with the known systems, thus increasing the reliability of operation. The acceleration that each ink chamber receives is transmitted to the ink, which thus also experiences an acceleration, so that pressure waves are generated in the ink chamber to thereby eject an ink droplet. This gives greater freedom in the design of an integrated inkjet array.

The inkjet heads according to the invention are accordingly very suitable for forming a complete row of ink chambers close together.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other advantages of an inkjet array according to the invention will be described hereinafter with reference to the accompanying drawings which are given by way of illustration only, and thus are not limitative of the present invention, and wherein.

DETAILED DESCRIPTION ON THE PREFERRED EMBODIMENTS

Figure 1:
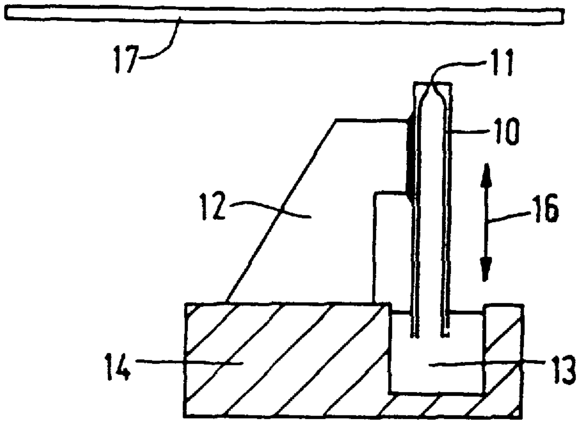
FIG. 1 diagrammatically illustrates a single inkjet head.

FIG. 1 diagrammatically illustrates the principle of an inkjet head as used in an array according to the present invention. An ink chamber 10 in the form of a glass capillary has a constriction at the top, thus forming a nozzle 11. The ink chamber 10 is stuck to a piezo-actuator or piezo-element 12. The latter is connected by one side to a fixed part 14, for example of a printer, while the ink chamber 10 can move freely with respect to said fixed part. This free movement can also be obtained by elastically connecting the ink chamber 10 to the surroundings by a silicone resin or rubber, for example. An ink supply chamber 13 is formed in the fixed part 14. The ink chamber 10 is inserted into the ink supply chamber 15. This ink chamber 10 is completely filled with ink by the capillary action. Of course, it is possible to provide the ink chamber 10 with ink in some other way or to construct the ink supply chamber 13 in some other way.

The piezo-element 12 is also provided with connecting electrodes (not shown), by means of which a sinusoidal or pulsed voltage can be applied across the element 12. This element thus vibrates and this oscillation is transmitted to the ink chamber 10, which can thus perform a movement in the direction of arrow 16, since the d31 mode (length mode) of the piezo-element is mainly used. The required voltage across the piezo-element is typically 1 to 50 volts. This voltage is dependent on the thickness of the piezo-element 12, its volume, the rigidity of the connection between the piezo-element and the ink chamber, the dimensions of the ink chamber, and also physical properties of the ink and the droplets.

As a result of the acceleration of the ink chamber 10, acoustic pressure waves will be generated in this chamber and are propagated therein at the speed of sound. The speed of sound in ink depends, in the present configuration, inter alia on the ink properties and the ink volume. A characteristic measurement of the deflection of the ink chamber 10 is 5–50 nanometers, and 0.1–2 bar for the amplitude of the pressure waves. By correct coupling of the acoustic impedance of the nozzle 11 and the ink chamber 10, the acoustic waves can bring the liquid in the nozzle into motion. The liquid can be regarded as incompressible. It is therefore possible to achieve speeds of flow better than 10 m/s. The ink flowing from the nozzle is then formed into a droplet by the action of the surface forces. By correctly adjusting the piezo-element control, particularly as regards the pulse width, it is possible to generate in the ink chamber 10 pressure waves which by interference yield a high amplitude and thus a high droplet speed for a relatively low control voltage.

Correct breaking off of the droplet which is ejected can also be ensured by way of the movement of the ink chamber 10. A further advantage can be obtained in this way in respect of the final speed of the droplet, and in the prevention of small satellite droplets which have an adverse effect on print quality. In the case of a capillary 10 having a diameter of 100 μm and a cross-section for the nozzle 11 of about 20 μm, ink droplets from 20 to 50 μm are thus obtained.

When the entire system resonates, a droplet frequency of about 500 kHz is obtained. By energizing the piezo-element 12 with one pulse, just one droplet is ejected. By supplying these energization pulses to the piezo-element 12 in accordance with an image signal, while a receiving sheet 17 is fed along the nozzle in synchronization with said image signal, an image formed by ink droplets can be obtained on said receiving material. In this mode about 50 kHz is obtained.

Good results have been obtained with ink chambers having a diameter less than 0.2 mm and having a rectangular cross-section smaller than 0.04 $mm^2$. Given an ink chamber cross-section of 0.2 mm, the diameter of the nozzle was 0.05 mm. Typical dimensions for the length of the chamber are a few millimeters. The choice of ink chamber length does not appear to be critical for a good drop-on-demand effect. The length of the ink chamber does determine the fluid resonance frequency. If the ink chamber 10 behaves as an oscillatory cavity (this depends on the acoustic impedance of the nozzle and the ink supply opening), the higher natural frequencies in the liquid are equal to 80×n kHz (for a speed of sound of 1000 m/s and an ink chamber length of about 6 mm). Other natural oscillations in the system may possibly also couple with the natural oscillations in the liquid. In practice it has been found that many of these natural oscillations can be damped by a choice of suitable material properties and geometries. Chamber lengths between 1 mm and 10 mm can be used.

By using ink chambers 10 having a diameter of 120 μm, the thickness of the piezo-elements 12 being about 100 μm, it has been possible to make an inkjet head with a straight row of nozzles having a total density of eight elements per mm. The ink supply chamber 13 can be common to all these ink chambers.

The glass ink chambers 10 are secured to the piezo-elements 12 by means of a glue (Araldite AV 138, to which approximately 30% aluminum oxide was added). The rigidity of this connection appears to be very important for efficiency. With optimum rigidity it was found that 1 volt was sufficient to generate droplets. It is also possible to connect the ink chambers 10 to the piezo-elements 12 in some other way, e.g. bonding, welding or soldering, etc.

The transition between the ink chamber 10 and the nozzle 11 also has some influence on the range of action of the inkjet head, but in practice it has been found that both a gradual and an abrupt transition are satisfactory.

Figure 2:
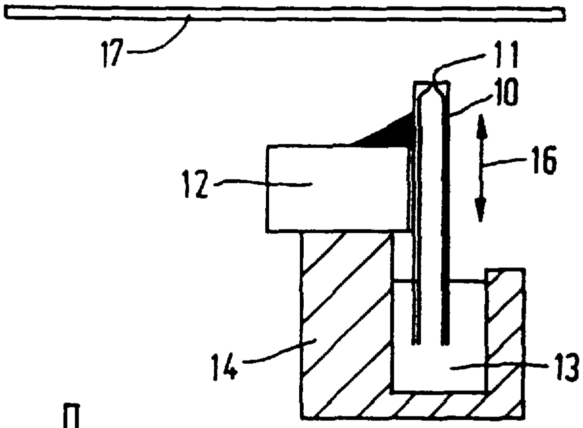
FIG. 2 shows another embodiment of an inkjet head.
Figure 3:
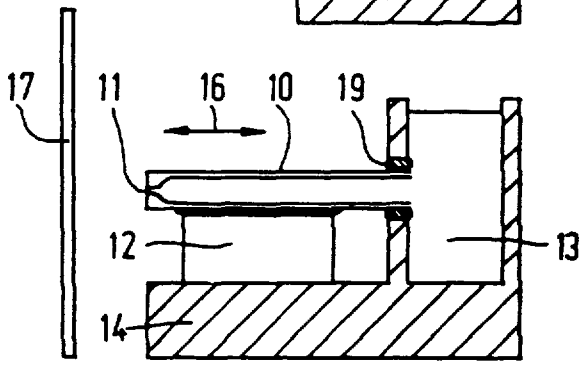
FIG. 3 shows a third embodiment of an inkjet head.

FIGS. 2 and 3 show two other inkjet heads diagrammatically, using the same references as in FIG. 1 for like elements. In FIG. 2, use is mainly made of the $d_{33}$ mode (thickness mode) of the piezo-element 12 by the choice and connection thereof. The capillary will therefore mainly move in the axial direction of arrow 16. In FIG. 3, the ink chamber 10 is flexibly connected to the ink supply chamber 13 by means of a silicone rubber packing 19. Here the piezo-element 12 is used in the shear-stress mode, so that the capillary moves mainly axially as indicated by horizontal arrow 16.

In the examples according to FIGS. 1, 2 and 3, the ink chamber 10 is always moved substantially axially, perpendicularly to the receiving sheet 17.

Figure 4A:
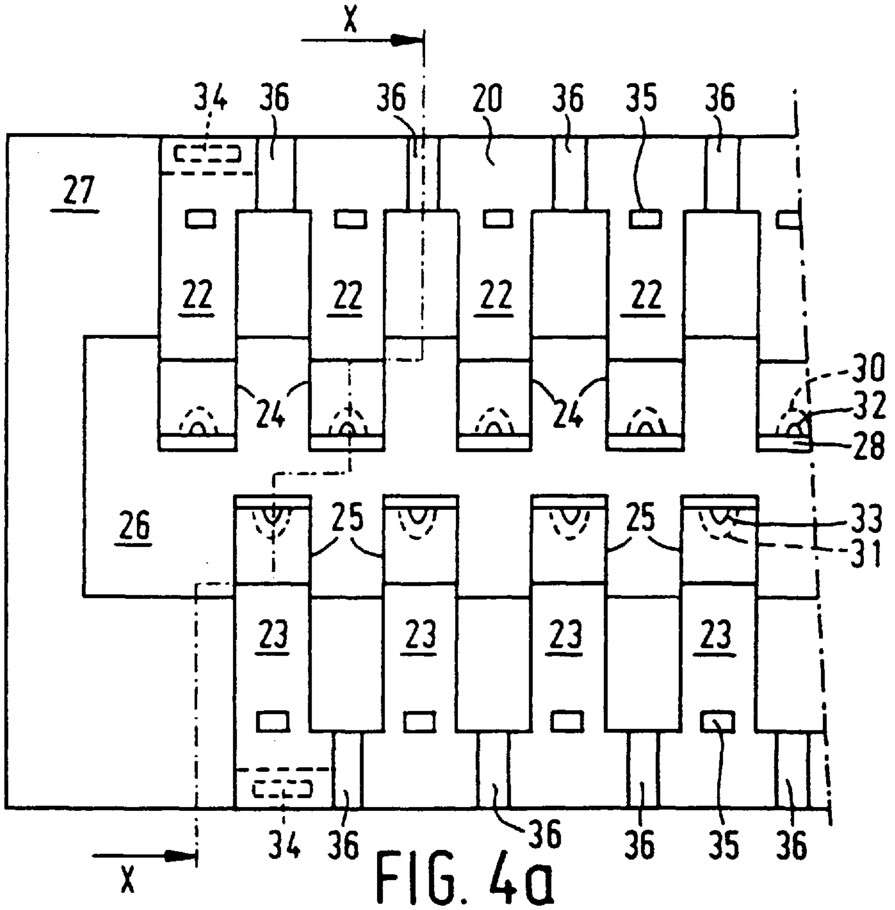
FIG. 4*a* shows an inkjet head array according to the present invention.
Figure 4B:
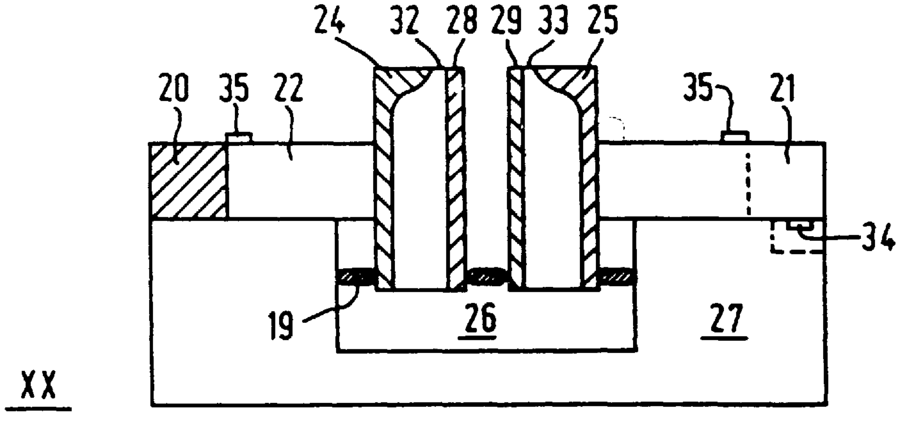
FIG. 4*b* shows a cross-section of FIG. 4*a* taken along line X—X.

FIGS. 4*a* and 4*b* show an inkjet head array according to the invention, FIG. 4*b* being a cross-section on x—x in FIG. 4*a*. A number of teeth 22, 23 are formed as a comb structure in a sheet of piezo-material 20, 21. The piezo-material 20, 21 is provided with an electrode layer on both sides, such layer being removed in areas 36 in order to obtain elements which can be energized separately per tooth 22, 23. The electrode layers are provided with connecting electrodes 34, 35 for each element. Ink chambers 24, 25 are rigidly secured to the ends of teeth 22, 23. The ink chambers 24, 25 are made from silicon rods, in which chambers 30, 31 are etched on one side and lead into nozzles 32, 33. These ink chambers 24, 25 are closed by Pyrex plates 28, 29.

The piezo-sheet 20, 21 is secured to a support 27 in which an ink supply chamber 26 is formed and is closed with silicone rubber 19. The ink chambers 24, 25 can be brought into motion independently of one another by energization via connecting electrodes 34, 35.

To produce an inkjet array of this kind, a sheet of piezo-electric material 20, 21 is used, a silicon strip being glued to one side and having a large number of chambers 30, 31 with nozzles 32, 33 etched therein. These chambers are then closed with a strip of Pyrex glass. Areas are removed from the plate by means of a diamond saw or by photolithographic techniques, to form teeth 22, 23 with the separate ink chambers 24, 25 connected thereto. The electrode layer is also removed from the sheet in areas 36 by means of mechanical or photolithographic techniques and connecting electrodes 34, 35 are applied.

An inkjet array of this kind can be made singly or, as described above, in a double construction over the full width of a receiving sheet for printing. Also, the inkjet array could be made in the form of a number of smaller modules which are provided stepwise or contiguously in a printer in a known manner. It is also possible to move a smaller module width-wise over a receiving sheet, to give a line printer. In the case of a double row of inkjet heads, the ink chambers can form a single row by making the teeth somewhat narrower than the spaces between the teeth and securing the two piezo-sheets 20, 21 on the support 27.

Figure 5:
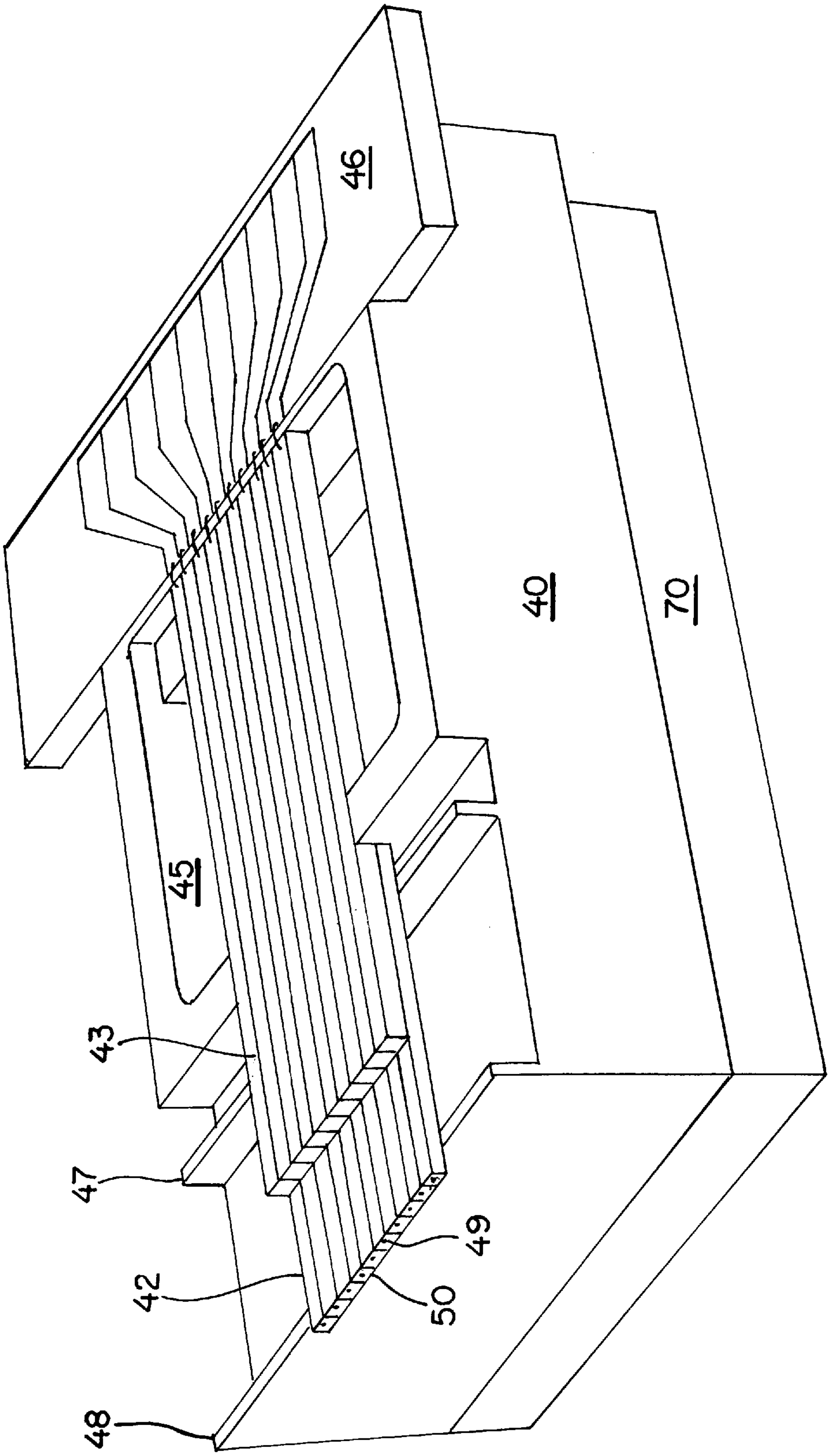
FIG. 5 is an illustration of another embodiment of an inkjet array.

FIG. 5 shows another embodiment of an inkjet array. With this type of inkjet heads, ink droplets are also released from small nozzle openings by means of an acoustic pressure rise in an ink chamber situated behind each nozzle opening. The surface tension of the ink prevents ink from emerging spontaneously from the nozzle opening. The pressure rise in the ink chamber is produced by an electrical pulse applied to a piezo-electric element. Since a number of this type of identical elements is used in the head, a large number of droplets can be jetted simultaneously. By movement of a receiving medium at the correct speed a short distance (0.5–2 mm) along the head and separately controlling each of the piezo-elements image-wise, it is possible to build up an image consisting of a number of ink dots.

Figure 8:
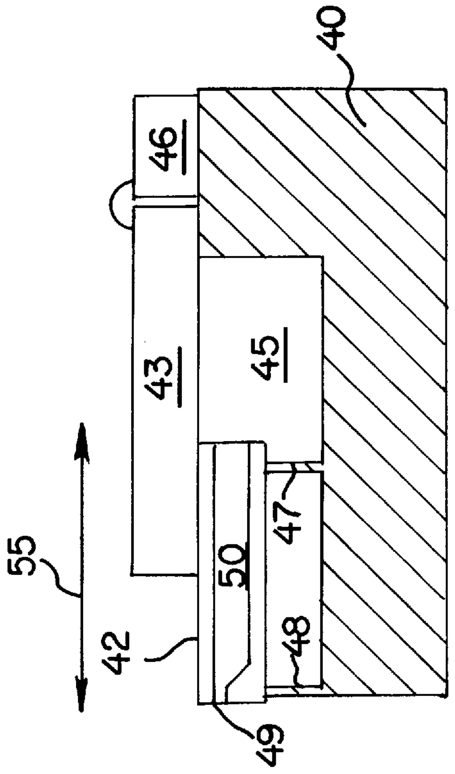
FIG. 8 shows a single element of the array according to FIG. 5.

FIG. 8 shows a single element of the array according to FIG. 5. The piezo-element or piezo-actuator 43 is provided with electrodes (not shown) with which a sinusoidal or pulsed voltage can be applied across the element 43. As a result the piezo-element pr piezo-actuator 43 oscillates and this oscillation is transmitted to the ink chamber 50 which can thus perform a movement in the direction of arrow 55. The voltage required across the piezo-element is typically 5 to 50 volts. This voltage is dependent on the thickness of the piezo-element, the volume of the piezo-element, the rigidity of the connection between the piezo-element and the ink chamber 50, the dimensions of the ink chamber, and other physical properties of the ink and the droplets. Acoustic pressure waves will be generated in the ink chamber 50 by its acceleration and are propagated in the ink chamber at the speed of sound. The speed of sound in the ink depends, in the present configuration, on the ink properties, the ink volume, and also the compliance of the walls of the ink chamber. A characteristic measurement of the deflection of the ink chamber is 50–500 nanometers, and 0.1–2 bar for the pressure wave amplitude.

By correct coupling of the acoustic impedance of the nozzle 49 and the ink chamber 50, it is possible to bring the liquid in the nozzle into motion. The liquid can be regarded as incompressible. Speeds of flow better than 10 m/s are possible. The ink emerging from the nozzle 49 is then formed into a droplet by the action of the surface forces. By correctly adjusting the piezo-element control, particularly as regards pulse width, it is possible to generate in the ink chamber pressure waves which by interference yield a high amplitude and thus a high droplet speed for a relatively low control voltage. The movement of the ink holder can also be used to ensure that there is correct breaking off of the droplet which is ejected. In this way, another advantage can be obtained in the final speed of the droplet, and in the prevention of small satellite droplets which have an adverse effect on print quality.

The ink is supplied to the ink chamber 50 via a feed duct 45 disposed in a support 40 (of metal or plastic). The ink chamber 50 is applied to support ribs 47 and 48 by a flexible glue connection. The electrical signals are supplied via connecting strip 46. A glass plate 42 is disposed between the ink chamber 50 and the piezo-element or piezo-actuator 43 to close off the ink chamber 50.

In FIG. 5, a number of elements in accordance with FIG. 8 are disposed on a holder 40. The numbering of FIG. 5 is identical to that used in FIG. 8. As shown diagrammatically, the array in FIG. 5 is made up of a set of identical elements each consisting of a finger 43 of piezo-electric material (hereinafter referred to as piezo-actuators) and an elongate ink chamber 50 with a nozzle opening 49 rigidly-coupled to the piezo-actuators. The ink chambers 50 are separated from each other and lie in a first plane. The piezo-actuators 43 is provided with electrodes (not shown), by means of which a sinusoidal or pulsed voltage can be applied, so that the piezo-actuators 43 can bring the ink chamber into motion and can thus eject a droplet.

In comparison with known piezo-electric high-density multi-nozzle inkjet heads, all the individual adjacent ink chambers in this invention are decoupled and the ink chambers can move entirely independently of one another. The advantage of this is that the ink chamber does not have to be deformed by the piezo-electric actuator in order to generate a pressure rise in the chamber. Another advantage is the improved acoustic insulation between adjacent inkjet elements. The complete decoupling between neighboring ink chambers in combination with the high density integration of the elements is possible in this invention because use is made of elongated ink chambers and elongated piezo-actuators 43 which extend substantially in continuation of one another and which are designed in a flat configuration.

The piezo-actuators and the ink chambers 50 are formed from flat sheets of material. The ink chambers 50 and the nozzle openings are made by anisotropic etching in silicon. High dimensional accuracy can be achieved with this technique. The ink chamber and the nozzle are closed at the top by a Pyrex glass cover 42. The connecting technique used in this connection is anodic bonding. The advantage of this is that no glue has to be used which might clog the ink ducts. The thickness of the silicon layer in which the duct structure is made is typically 200 to 400 microns, the thickness of the glass cover is typically 100 to 200 microns. The depth and the width of the ink chamber itself is typically 75 to 200 microns. The nozzle openings through which the droplets are ejected have a typical dimension of 20 to 50 microns. Good droplet formation results are obtained with ink chambers having a length of some millimeters. The length of the ink chamber determines the natural inherent frequency of the ink column in the chamber. This frequency can couple with natural frequencies of the piezo-electric actuator. More particularly the amplitude of the voltage required can be controlled in this way. Typical liquid natural frequencies in the ink chamber are in the range from 30 to 150 kHz. The ink chambers of the nozzles can naturally also be made by means of other materials and forming techniques.

The piezo-elements are sawn from a flat piezo-electric material. Before sawing, the electrode material is applied to both sides of the piezo-elements. The piezo-actuators 43 have a typical height of 50 to 500 microns and a width of 75 to 400 microns. The length of the piezo-actuators 43 is some millimeters so that each actuator has a rod-like shape (1–20 mm). The electrodes of each individual piezo-actuators 43 are electrically connected to the driver IC's (not shown in the drawings). Like the liquid column in ink chamber 50, the piezo-elements also have natural frequencies which are important to the good action of the droplet generator. Piezo-element natural frequencies have been measured between 20 kHz and 500 kHz. Voltages required to eject the droplets are typically 5 to 50 volts. In order to avoid cross-talk between the individual piezo-actuators in the cam structure, the fingers can be separated completely by sawing-out the bridges between these fingers.

The silicon/glass ink chambers are connected to the piezo-actuators 43 by means of glues (e.g. Araldite AV 138 containing approximately 30% aluminum oxide), but other connecting techniques are possible. This rigid connection between the ink-chamber 50 and the related piezo-actuator 43 lies outside the first plane. This means that no piezo-material is situated between the separate ink-chambers so that a high density of elements can be achieved. The quality of the connection is very important, because it determines how well the piezo-actuator can transmit the acoustic energy to the ink. The other end the piezo-elements are glued to a holder. In addition, the ink chambers are supported at another two points by thin strips 47, 48 which stand on the support 40. This support 40 can also be constructed in any other manner.

To achieve a more rigid construction of the array, the spaces around the piezo-actuators 43 and also around the ink-chambers 50 of FIG. 5 are provided with an elastic material. This material can also be used for forming the feed duct 45 whereby leakage of ink round the ink-chambers 50 is effectively prevented.

Figure 6:
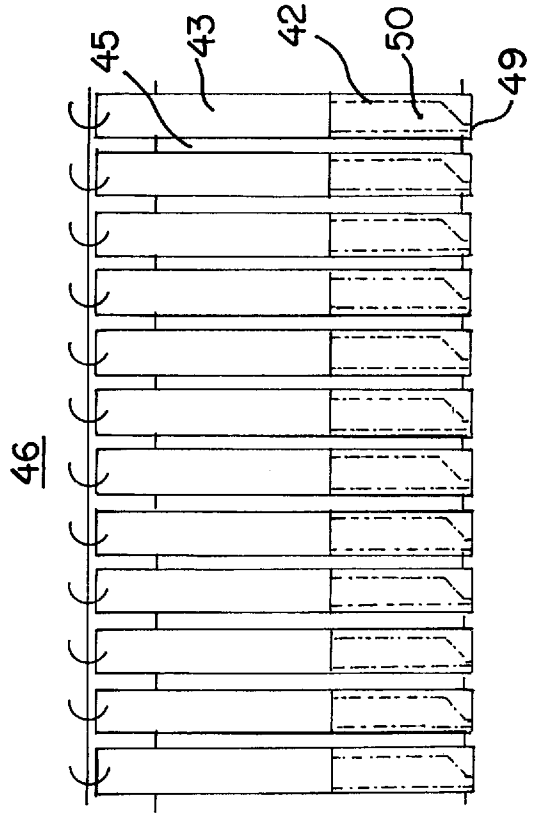
FIG. 6 is a top plan view of FIG. 5.
Figure 7:
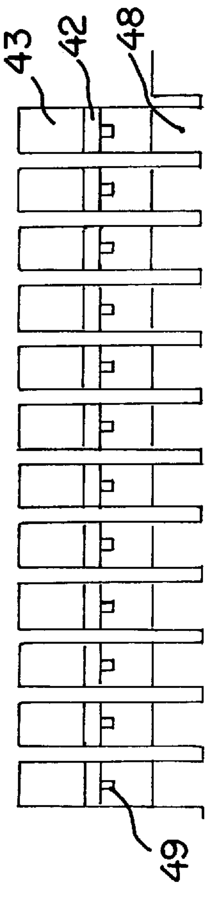
FIG. 7 is a front elevation of FIG. 5.

FIG. 6 is a top plan view of the inkjet array according to FIG. 5 and FIG. 7 is a front elevation. These Figures use the same numbering as FIGS. 5 and 8. The shape of the nozzle 49 is readily visible from FIGS. 6 and 7. It has been found that instead of the rectangular nozzles used here, it is possible to use other shapes, such as round or oval, which may or may not be flattened on one side.

The inkjet heads described are not only suitable for liquid inks at room temperature, but also hot-melt applications in which the heads are brought to a temperature at which the hot-melt inks are liquid.

The holder 40 can be provided with a heating element 70 to bring the whole array to a temperature between 100° C. and 150° C. whereby hot-melt inks become liquid. Under these circumstances the demands for the adhesive between the piezo-actuators 43 and the ink-chambers are different in relation to the demands for use at room temperature. A very good result was achieved with a two component epoxy resin comprising in component A. A reaction product of Bisphenol-A and Epichlorohydrin filled with about 10% by weight Aluminum-silicate. The B-component comprises a mixture of about 50–60% by weight pyromellitic dianhydride and about 40–50% mica (Eccoband 104). After mixing of 100 parts by weight of component A and 64 parts by weight of component B at 60° C., hardening takes place at 120° C.

The ink chamber array can also be made in some other way. For example, a number of glass capillary tubes can be disposed next to one another, with or without intermediate spacing, and connected by a suitable plastic to form a sheet-like tube structure. This is secured to the piezo-sheet in the same way as described with reference to FIGS. 5–8. By heating and then stretching the tubes, constrictions are formed. These constrictions act as nozzles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An inkjet array for a printer comprising:

a holder;

a plurality of elongated ink chambers, each ink chamber being separated from other ink chambers and each ink chamber having a nozzle;

means for supplying ink to the ink chambers; and a plurality of piezo-actuators each having a rod shape being rigidly secured to the holder and to one side of a respective elongated ink chamber, an image signal being receivable by at least one of the piezo-actuators whereafter the ink chamber connected to a piezo-actuator receiving the image signal is moved in a direction generally parallel to an axis of the chamber to thereby eject an ink droplet from the nozzle thereof.

2. The inkjet array according to claim 1, wherein each of the ink chambers has a longitudinal axis and wherein the piezo-actuator receiving the image signal moves the ink chamber connected thereto in a direction generally parallel to the longitudinal axis of the ink chamber.

3. The inkjet array according to claim 2, wherein the longitudinal axes of the ink chambers are generally Parallel and wherein the piezo-actuators reciprocate the ink chambers in forward and reverse directions which are generally parallel to the longitudinal axes.

4. The inkjet array according to claim 1, wherein each of the ink chambers has a longitudinal axis and wherein the piezo-actuator receiving the image signal reciprocates the ink chamber in forward and reverse directions which are generally parallel to the longitudinal axis of the ink chamber.

5. The inkjet array according to claim 1, wherein each of the ink chambers is formed from silicon and has one side closed with glass.

6. The inkjet array according to claim 1, wherein each of the ink chambers is formed from glass capillary tubes.

7. The inkjet array according to claim 1, further comprising a heating element in the holder, the heating element heating ink in the means for supplying ink.

8. The inkjet array according to claim 1, wherein each ink chamber is individually movable by the piezo-actuator attached thereto independently of movement of adjacent ink chambers.

9. The inkjet array according to claim 1, wherein adjacent ink chambers are independently movable.

10. The inkjet array according to claim 1, wherein the piezo-actuators can move adjacent ink chambers sequentially and thereafter move at least some of the adjacent ink chambers simultaneously.

11. The inkjet array according to claim 1, wherein the ink chambers are electrically insulated from one another.

12. The inkjet array according to claim 1, wherein a space is provided between adjacent ink chambers and piezo-actuators, the space being filled with an elastic material.

13. The inkjet array according to claim 1, wherein the piezo-actuators are secured only to the one side of the respective elongated ink chamber.

14. A method for ejecting an ink droplet from a nozzle of an elongated ink chamber in an inkjet array for a printer, the inkjet array having a plurality of rod shaped ink chambers, the ink chambers being individually attached to piezo-actuators of the inkjet array and being connected to an ink supply, each ink chamber having a longitudinal axis, the method comprising the steps of:

supplying ink to the ink chambers from the ink supply;

supplying an image signal to at least one of the piezo-actuators;

moving the ink chamber attached to the piezo-actuator receiving the image signal, the ink chamber being separated from adjacent ink chambers to therefore move independently of the adjacent ink chambers and the ink chambers moving in a direction generally parallel to the longitudinal axis thereof; and ejecting the droplet of ink from the nozzle of the ink chamber upon movement of the ink chamber.

15. The method according to claim 14, wherein the longitudinal axes of the ink chambers are generally parallel and wherein the step of moving the ink chamber comprises reciprocating the ink chambers in directions generally parallel to the longitudinal axes.

16. The method according to claim 14, further comprising the step of providing one of a sinusoidal and pulsed voltage to the piezo-actuator when the image signal is supplied thereto whereafter the ink chamber attached to the piezo-actuator is moved.

17. The method according to claim 14, wherein the piezo-actuators are rigidly secured to a holder and wherein the method further comprises the step of heating the holder.

18. The method according to claim 14, wherein the ink chambers are provided in a plurality of planes, each of the planes having a plurality of ink chambers, the method further comprising the step of moving ink chambers in different planes, each of the ink chambers being individually movable by one of the piezo-actuators.

19. The method according to claim 14, further comprising the step of providing a space between adjacent ink chambers and piezo-actuators, the space being filled with an elastic material.

20. The method according to claim 14, further comprising the step of securing the piezo-actuators only to the one side of the respective elongated ink chamber.

* * * * *